Feb. 20, 1923.

C. H. BRYANT ET AL.
CASTER.
FILED MAR. 29, 1921.

1,445,747.

WITNESS:—
Chas. L. Greesbauer

Inventor
Claude H. Bryant &
Raymond A. Osborn
By Bacon & Thomas.
Attorney

Patented Feb. 20, 1923.

1,445,747

UNITED STATES PATENT OFFICE.

CLAUDE H. BRYANT AND RAYMOND A. OSBORN, OF LINCOLN, MAINE.

CASTER.

Application filed March 29, 1921. Serial No. 456,593.

*To all whom it may concern:*

Be it known that we, CLAUDE H. BRYANT and RAYMOND A. OSBORN, citizens of the United States, residing at Lincoln, in the county of Penobscot and State of Maine, have invented certain new and useful Improvements in Casters, of which the following is a specification.

The invention relates to improvements in casters of the ball bearing type.

It is an object of the invention to provide a caster which is exceedingly simple in construction, and when applied to an article of furniture or the like will permit the same to be freely moved upon a supporting surface with a minimum of friction.

More specifically, the invention comprehends the provision of a ball bearing caster in which the body of the caster consists of a single piece of material recessed to receive a row of relatively small anti-friction bearings interposed between the lower surface of the recess and the anti-friction caster ball. The caster is therefore one which is inexpensive to manufacture, consisting of a minimum number of parts which are assembled in a compact relation. The main caster ball is preferably retained in position by a movable retaining spring seated within a groove formed in the surface of the socket whereby the caster ball may be conveniently removed for the replacement of bearings, if desirable, yet when all of the caster parts are assembled they will remain permanently in an operative position against accidental displacement.

In the accompanying drawings we have shown the preferred embodiments of my invention, but these disclosures are merely for the purpose of illustration, and the caster is subject to many changes without departing from the spirit of the invention.

Figure 1:
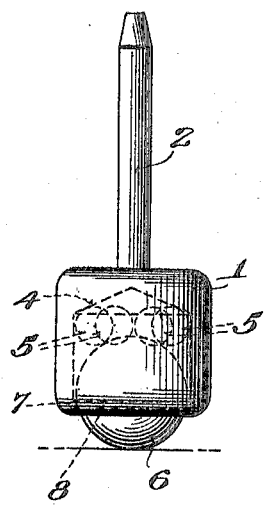
Figure 2:
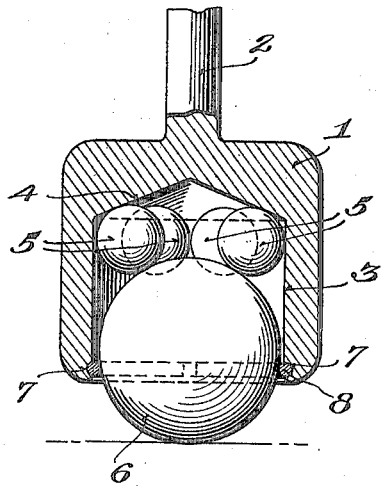
Figure 3:
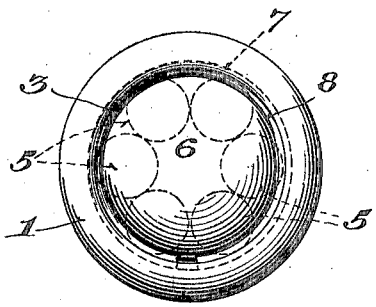
Figure 4:
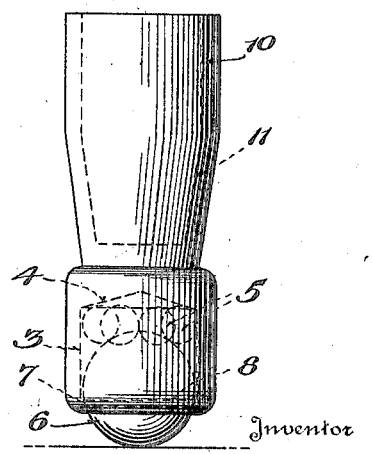

In the drawings, Figure 1 represents a side elevation showing caster and anti-friction balls in dotted lines. Fig. 2 is a vertical section of body disclosing anti-friction balls and caster ball in elevation. Fig. 3 is a bottom plan view, and Fig. 4 is a side elevation showing a modified form of extension.

Referring now more particularly to the drawings, wherein like reference characters designate corresponding parts, the numeral 1 designates the body of the caster, which is preferably one adapted for beds, tables, chairs, etc., having the neck or extension 2 integrally cast with the body or casing 1.

The body or casing 1 is, as disclosed provided with an interior socket 3 of a relatively large diameter having a seat 4, which is slightly inclined toward the center and receives the row of anti-friction balls 5 disposed in circular formation therein. Any suitable anti-friction rollers may be employed, and for the purpose of illustration I have shown the conventional steel balls.

There is also disposed within the hollow interior of the casing 1 the caster ball 6, which normally projects beyond the casing and seats upon or engages the anti-friction balls 5. These balls therefore constitute an anti-friction support interposed between the main caster ball 6 and the ball bearing surface 5 to facilitate the movement of furniture to which the caster is applied with the least possible friction. To maintain the main caster ball 6 in position I preferably provide in the inner surface of the walls of the casing 1 a circumferential chamber 7 extending entirely therearound, which chamber receives the removable retaining wire 8, which engages the side of the main caster ball 6 below its center so as to prevent said ball from dropping from within the socket in the casing, but of course in no way serving to bind or impede the rotation of this caster ball. This retaining ring is preferably of spring wire or steel, and may be readily inserted within the circumferential chamber formed in the caster body. It will be noted that when the various parts of the caster are assembled that the entire article is very compact in formation and consists of few parts, so that the same is inexpensive to manufacture. There being no fragile or weak elements in the casting, the same obviously possesses much strength and should it be desirable to replace any parts thereof, it is only necessary to remove the spring retaining wire 8 whereupon the main caster wheel or ball bearings may be replaced. The caster is preferably attached to furniture or the like by inserting the neck 2 within an opening in the furniture although other means of attachment may be resorted to, if desirable.

In Figure 4 of the drawings we have shown another form of the invention, but this merely relates to the method of attaching the casting to furniture. In this construction the body 3 of the caster is of the same construction as disclosed in Figure 1, and the anti-friction balls 5 and main caster 6 are arranged in the identical manner. However, instead of providing the extension 2, this form of caster comprises a socket member 10 projecting from the body 3 having a hollow interior 11 adapted to receive the leg of a piano, chair or the like, by which means the caster is applied to the article for which it is used. It will of course be understood that the caster can be united to furniture manners other than herein shown, and described, and we wish it to be understood that we are not limited in any sense to the means herein disclosed by which the caster is attached to furniture or the like.

Having thus described the invention, what we claim is:

A caster comprising a metallic body having a socket therein, the side walls of said socket presenting substantially smooth surfaces and the upper wall of said socket inclining from each side to the center thereof and having a smooth upper surface constituting a raceway for anti-friction bearings, anti-friction bearings disposed within the socket and engaging the smooth upper wall thereof, a large main caster within the socket and partially housed therein, the side walls of the socket near the outer end thereof being provided with a groove formed in the material forming the socket, and a resilient caster retaining spring seated within said groove and retained therein, said retainer spring engaging the main caster below its center for detachably holding the caster in the socket.

In testimony whereof we affix our signatures.

CLAUDE H. BRYANT.
RAYMOND A. OSBORN.